United States Patent [19]
Hughes et al.

[11] Patent Number: 5,842,040
[45] Date of Patent: Nov. 24, 1998

[54] POLICY CACHING METHOD AND APPARATUS FOR USE IN A COMMUNICATION DEVICE BASED ON CONTENTS OF ONE DATA UNIT IN A SUBSET OF RELATED DATA UNITS

[75] Inventors: James P. Hughes, Lino Lakes; Steve A. Olson, South St. Paul, both of Minn.

[73] Assignee: Storage Technology Corporation, Louisville, Colo.

[21] Appl. No.: 666,638

[22] Filed: Jun. 18, 1996

[51] Int. Cl.$^6$ ............................................. G06F 13/42
[52] U.S. Cl. ................................... 395/831; 395/828
[58] Field of Search ................... 370/231, 256, 370/392, 232; 371/57.2, 30; 395/403, 440, 447, 455, 200.11, 703, 309; 340/825.22; 348/441; 380/21

[56] References Cited

U.S. PATENT DOCUMENTS

| | | | |
|---|---|---|---|
| 5,280,480 | 1/1994 | Pitt et al. | 370/256 |
| 5,291,442 | 3/1994 | Emma et al. | 395/447 |
| 5,325,504 | 6/1994 | Tipley et al. | 395/455 |
| 5,347,642 | 9/1994 | Barratt | 395/440 |
| 5,394,408 | 2/1995 | Nishihara et al. | 371/57.2 |
| 5,418,922 | 5/1995 | Liu | 395/403 |
| 5,442,624 | 8/1995 | Bonomi et al. | 370/231 |
| 5,444,491 | 8/1995 | Lim | 348/441 |
| 5,533,033 | 7/1996 | Ratner | 371/30 |
| 5,557,747 | 9/1996 | Rogers et al. | 395/200.11 |
| 5,566,170 | 10/1996 | Bakke et al. | 370/392 |
| 5,608,908 | 3/1997 | Barghouti et al. | 395/703 |
| 5,614,891 | 3/1997 | Zeinstra et al. | 340/825.22 |
| 5,625,622 | 4/1997 | Johri | 370/232 |
| 5,644,751 | 7/1997 | Burnett | 395/440 |
| 5,699,532 | 12/1997 | Barrett et al. | 395/309 |

*Primary Examiner*—Thomas C. Lee
*Assistant Examiner*—Chien Yuan
*Attorney, Agent, or Firm*—Brooks & Kushman, P.C.

[57] ABSTRACT

A policy caching method for use in a communication device is provided. The communication device determines which instance of protocol data unit (PDU) network policy from a plurality of policies is to be applied to related-received PDUs based on contents of one of the related-received PDUs. Subsequently, policy identification information identifying the instance PDU policy is cached for future application to other of the related-received PDUs. Also, a communication device which implemented this policy caching method is provided.

35 Claims, 3 Drawing Sheets

POLICY CACHING METHOD AND APPARATUS FOR USE IN A COMMUNICATION DEVICE BASED ON CONTENTS OF ONE DATA UNIT IN A SUBSET OF RELATED DATA UNITS

GOVERNMENT LICENSE RIGHTS

The U.S. Government has a paid-up license in this invention and the right in limited circumstances to require the patent owner to license others on reasonable terms as provided for by the terms of Contract No. MDA 904-94-C-F059 awarded by the Maryland Procurement Office, 9800 Savage Road, Fort George G. Meade, Md. 20755.

FIELD OF THE INVENTION

The present invention relates to data communication and more particularly to policy management on the data communication.

BACKGROUND OF THE INVENTION

In a data communication network, the routing, bridging, switching, filtering, and auditing functions of protocol data units (e.g., data packets, cells, or frames which contain voice, video, or data information) are collectively handled by network policies.

To better understand how network policies work within a data communication network, an analogy may be helpful. In many respects, data communication networks are similar to postal delivery systems, with pieces of mail, such as letters or packages, being comparable to the protocol data units which are transferred within a data communication network. In a postal delivery system, the pieces of mail may be input into the postal delivery system in a variety of ways. Once within the postal delivery system, all of the pieces of mail are collected and transported to nearby processing facilities where the pieces of mail are sorted for further processing.

Although each piece of mail will have a unique delivery address, most of the pieces of mail are automatically sorted by a shorter zip code or some other type of routing code. Letters without zip codes must be sorted and processed by hand. Once the mail has been sorted by destination it is routed through additional intermediary processing facilities until it arrives at the locale indicated by the destination on the piece of mail. All of these procedures for sorting and delivering the piece of mail are governed by rules and procedures.

In addition to processing pieces of mail for routing the mail to the correct destination, the pieces of mail may go on through several other processing steps. For example, if the piece of mail is going out of the country, the policy is that it must go through a customs operation in each country. If the national postal delivery system is being used to deliver the piece of mail then it must also be transferred from one national postal delivery system to another. In a private postal delivery system however, this transfer step would not be necessary. The pieces of mail may also be monitored or filtered for such things as mail fraud violation or shipment of hazardous materials. All of these operations also are governed by policy set forth by rules and procedures.

Data packets are manipulated in a data communication network in a manner similar to that by which pieces of mail are delivered in a postal delivery system. Data packets, for example, are generated by many different types of devices and are placed onto a communication network. Typically, the data packets are concentrated into a forwarding device, such as a local bridge or router, and are then directed by size and destination over one or more media types (e.g., fiber optic) which are connected to destination devices that could be other larger or smaller bridges or routers. These destination devices then deliver the data packet to its terminal end point (i.e., the end user). Along the way the data communication network may perform policy checking (i.e., filtering and auditing/monitoring functions) with respect to the data packets. These routing, bridging, switching, filtering, and auditing functions are also governed by policy set forth by rules and procedures set by system administrators and the like. These rules and procedures are generally known as communications network policies.

As communication networks increase in size, complexity and speed, it becomes increasingly essential to set and maintain network policies for handling protocol data units (PDUs) in an efficient manner. Enforcement of network policies is typically done by a communication device. The device determines a disposition of the PDUs based on network policies which have been programmed into the device.

Just like postal delivery systems have experienced ever increasing volumes of mail which must be delivered, the volume of PDUs being transferred across computer/data communication networks continues to increase as experience is being gained with this new form of communication delivery system and as more and more applications, with more and more expansive means are being developed. In addition, quickly changing technology has made the underlying data transmission resources for computer communication networks relatively inexpensive. Fiber optics, for example, offer data transfer rates in the gigabit per second range.

A need exists for a way to enforce network policies on these high speed networks which is efficient, low cost, and minimizes the effect that enforcing network policies has on PDU throughput rates for devices enforcing these policies. The present invention provides a solution to this and other problems, and offers other advantages over the prior art.

SUMMARY OF THE INVENTION

The present invention provides an network policy caching scheme which addresses the problem of enforcing policy at high data throughput rates by analyzing one PDU from a group of related PDUs to determine a network policy for the PDU, caching the relevant portion of the policy, and applying that cached policy to the other related PDUs without requiring a complete analysis of the other related PDUs.

In accordance with a first aspect of the invention, a policy caching method is provided for use in a communication device. For example, the communication device may be a data network device, a computer, a monitoring device, a switch, a router, a bridge, or a firewall. This method is performed by device-implemented steps in a series of distinct processing steps that can be implemented in one or more processors. An instance of protocol data unit (PDU) network policy from a plurality of policies which is to be applied to related-received PDUs is determined based on contents of one of the related-received PDUs. For example, when a PDU is received, it's relevant policy is checked. This policy may be very broad and complex such that it requires significant analysis. If this received PDU is considered an instance of policy that is expected to occur many times, then it is a candidate for a cache operation. Examples of such policies are filtering (e.g., forward or not forward the PDU) and/or auditing (e.g., send a copy of the PDU to a third party). Preferably, this analysis for network policy is performed on the first PDU received. Subsequently, policy identification information identifying the instance of PDU policy is cached for future application to other of the related-received PDUs.

Once the policy is cached, the instance of PDU policy from the plurality of policies preferably is applied to another PDU of the related-received PDUs based on using the cached policy identification information. In addition, the instance of network policy is performed by filtering or auditing the related-received PDUs.

In operation, a stream of PDUs is received from a communication link. A subset of PDUs from the stream of PDUs preferably are grouped together as the related-received PDUs based on selection criteria. This selection criteria may take many forms. For example, the related-received PDUs may be asynchronous transfer mode (ATM) cells of a packet or a number of the packets. Alternatively, the related-received PDUs may be PDUs from the stream of PDUs which have identical categorization fields such as: circuit numbers, source or destination addresses, source or destination ports on a communication interface, network protocols, transport protocols, security options, or other contents in any PDU field.

This first aspect of the invention also can be implemented as a policy cache for use in a communication device which is coupled to an data communication link. The policy cache includes an exception processor which determines an instance of PDU network policy from a plurality of policies which is to be applied to related-received PDUs based on contents of one of the related-received PDUs. A cached instance classifier is operatively coupled to the exception processor to cache policy identification information identifying the instance of PDU policy which is to be applied to other PDUs of the related-received PDUs.

An instance policy cache preferably is operatively coupled to the exception processor to cache the instance of PDU policy which is to be applied to other PDUs of the related-received PDUs.

This policy cache preferably is incorporated into a communication device which also includes a data stream processor. The data stream processor applies the instance of PDU policy from the plurality of policies to another PDU of the related-received PDUs by utilizing the cached policy identification information to retrieve the cached instance of PDU policy from the instance policy cache.

These and various other features as well as advantages which characterize the present invention will be apparent upon reading of the following detailed description and review of the associated drawings.

DETAILED DESCRIPTION OF THE PREFERRED EMBODIMENT

Figure 1:
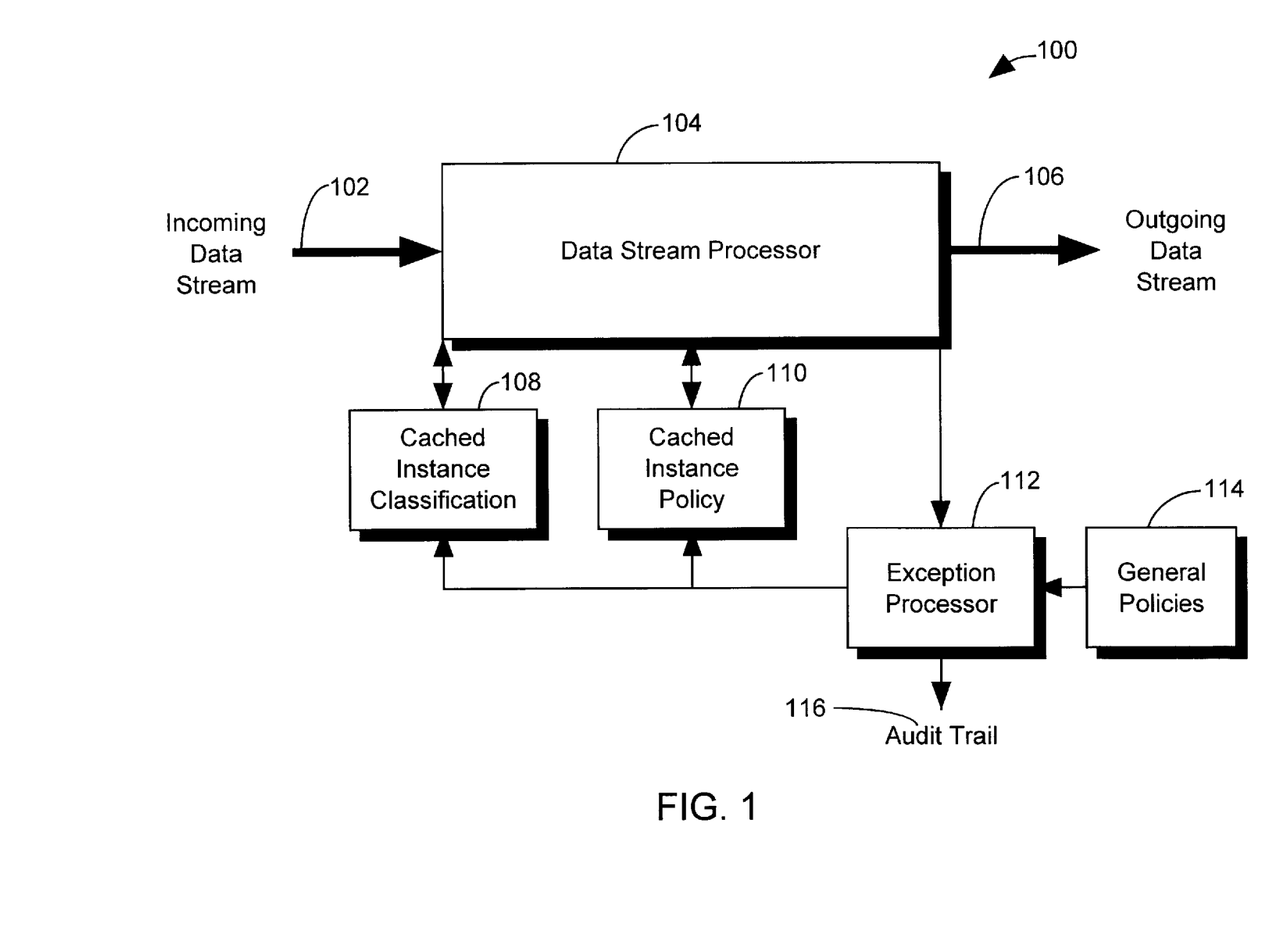
FIG. 1 is block diagram showing a preferred embodiment communication device having a policy cached in accordance with the present invention.

The preferred embodiment communication device shown in FIG. 1 will be described in exemplary form with reference to asynchronous transfer mode (ATM) communications. A general discussion of the technical features and functions of ATM communication is given, for example, in a book by McDysan, David E. and Spohn, Darren L., *ATM: Theory and Application,* McGraw-Hill, Inc. 1995. However, it will be appreciated by those skilled in the art that the principals described herein may be applied to any data communication system which communicates information as PDUs.

The communication device 100 typically is connected to physical media which provides timing and carriers for point to point connections. In an ATM environment, these connections are used to hook switches together or to provide services between the public network and the private or customer premise equipment.

This communication device 100 preferably is an end point for the physical media and does not implement any physical layer management except for the line status necessary to notify the source of the line quality. In alternative embodiments, the physical layer management may be incorporated into communication device 100 in which case it also may perform other data networking functions (e.g., switching, routing, or bridging) consistent with the network policies which communication device 100 is enforcing.

In ATM signaling, filtering and logging are possible on individual PDUs. If there is only one of these devices 100 in the path between the source and destination, then all that can be done is the filtering and logging of connections. This is an important function but does not provide privacy across the network or to authenticate interface to the public network.

The ATM signaling provides another level of control. After the ATM connection is complete, information is provided for use by the PDU filtering hardware to control PDU content. This allows complete flexibility in designing IP PDU filters based on the source and destination ATM addresses. An illustration may serve to help explain this. If a certain IP address can only be accessed through a limited set of ATM addresses, then this IP address can be made invalid if the PDU comes across a VC that is not from the correct set of ATM source addresses.

In the preferred embodiment, the ATM connections will be checked against valid or invalid source, destination and pairwise lists of ATM addresses and, if it is allowed, the connection completed. Regardless of whether the connection is completed, the connection attempt will be logged for auditing purposes.

When the ATM pair is defined (either explicitly or implicitly) as being allowed to communicate, the per PDU policy is also established. The requested class of service (COS) is also validated and potentially changed to meet the policy goals.

When the connection is completed, this information is communicated to the PDU filter.

Some policy rules that can be applied to an ATM connection include:

1. Allow/Disallow.
2. AAL type (both in the signaling-and-enforcing that the actual data stream contains the allowed ATM adaptation layer (AAL)).
3. Class of service (bandwidth, burstiness, etc.).
4. PDU contents.

If a connection is allowed and the traffic is not packetized (i.e. Video), it can be allowed although filtering of contents is not possible (AAL type filtering and cell rate enforcement are still possible).

ATM Cells passing through virtual circuits are processed by the filter and logging engine (i.e., communication device 100). If there are filter devices at both sides of the public network, privacy and authentication can be done.

When a cell attempts to cross the filter boundary the virtual circuit identifier (VCI) is checked to ensure that there is an open VC for this cell. Furthermore, the rate at which the cells are arriving is checked to ensure that there is not a run-away. If the cell is either against a non open VC or is exceeding its allowance, the PDU is logged and/or dropped. This will be true whether or not there is a filter at the far side and will also be true for switched virtual channels (SVCs) or permanent virtual channels (PVCs).

Run-away cell streams are a significant threat. Denial of service attacks within the public network are, by some standards inescapable. If a cell stream goes wild and fills the available capacity in the public network and denies service within the public network that is one thing. The problem being addressed here is more significant than that. If a run-away cell stream is allowed to enter a compartment, nodes to node traffic that is not involved in public network traffic can be denied service. If at all possible this attack should be at audited and stopped.

The method of operation is that the cell address is looked up or hashed in a table. The table entry will contain a "program" to execute against a VC. VCs can be of type AAL 1,2,3,4, or 5 in ATM. If the VC is declared to be AAL5 or AAL3/4 it can be further filtered for contents.

In addition to ATM circuit monitoring (and potential circuit encryption) as part of enforcing network policies, if the traffic is packetized (like AAL5), a policy for PDU contents can be enforced. This policy can be simple or complex. Information that can be filtered includes:

1. Network Protocol (e.g., IP),
2. Source address,
3. Destination address,
4. Security options, (e.g., DNSIX, RIPSO (RFC 1108) CIPSO,
5. Transport protocol (e.g., TCP, UDP)
6. Syn, Fin flags (TCP only)
7. Source port, or
8. Destination port.

This filtering may also involve a combination of two or more of these fields. The filtering may be a comparison to a predetermined value or a check for values being within a range of possible values.

The method of operation is that every combination of protocols, addresses, and ports is a key. This tuple (called a session) represents a single TCP or UDP session, user, application or service. The session is logged and PDU statistics are kept for the length of time that the session is active.

This is achieved by spending a relatively large amount of time (in the milliseconds) to filter the first occurrence of a connection tuple (session) against the complete set of rules. When a new session occurs, it represents a TCP connection request or the first UDP request ever or at least the first request since the communication device 100 was initialized. In any case, this delay is only on the first packet and is not expected to be longer than the normal retransmit times.

After the first message has been checked, the communication device policy cache is loaded with the necessary information such that when further PDUs arrive, they will not be side-tracked, but will be forwarded in an efficient manner. Thus, subsequent ATM cells of subsequent packets will be delayed on the order of microseconds.

IP fragments are supported through the complete filtering (IP and TCP or UDP) of the first packet and subsequent filtering of just the IP layer data on the remaining packets. This will ensure that all "first" packets will be completely analyzed, and if they are found to be invalid discarded. The remaining packets of the stream may be allowed through the communication device 100, but the destination will not be able to reassemble the packet from the IP segments.

Referring once again to FIG. 1, the particular operation of a preferred embodiment communication device 100 will now be given.

In an ATM environment, the communication device 100 operates on a cell by cell basis. The delay incurred by any cell will be small. Every operation, software or hardware, is designed to complete in less than one cell time. The only exception is error handling. By keeping the operations less than one cell time, the communication device 100 will need very little cell buffering capability.

When the communication device 100 is part of an apparatus which is receiving a data stream 102 directly from an ATM communication link, the incoming cell from the private network is first processed by a synchronous optical network (SONET) framer within the data stream processor 104 into an ATM cell stream. Any header error control (HEC) errors are noted by the framer and corrected, if possible. The framer also provides a total count of incoming cells and erroneous cells.

ATM header and payload association occurs after the framer. The ATM header, SNAP header and IP header are identified and unique words are placed in a user defined header. The user defined header may be between four and eight byte long field attached to the front of every cell. The user defined header contains fields for cell information, Crypto addressing, ATM header association and IP association. These functions may be implemented in a field programmable gate array (FPGA) alone or in combination with commonly available ATM chip sets for ATM cell framing.

The cells along with their user defined header is then forwarded so that cell disposition function (i.e., network policy assessment and enforcement operation) can be performed. Typically all of these operations are performed simultaneously on two data streams: one headed upstream and the other downstream through the communication unit. FIG. 1 shows the functional blocks which manipulate one of these two data streams. These functional blocks would be duplicated for operations on the other of the two data streams. In some embodiments, of the present invention it is possible that one or more of these functional blocks is actually one physical device shared by components performing operations on both data streams. For example, the general policies 114 may be stored in a memory which can be accessed by other components working on both data streams.

The network policy assessment and enforcement function in the communication device 100 is performed through the use of a policy cache. The cache allows high speed operations to be performed on the PDUs (i.e., cells in the ATM environment) with nominal delay added to PDU end to end transport times.

The policy cache includes an exception processor 112 that determines an instance of PDU network policy from several policies which may be applied to related-received PDUs based on contents of at least a first received PDU of the related-received PDUs. A general policy storage mechanism 114 is operatively coupled to the exception processor 112 that stores the network policies such that the exception processor 112 can query the general policy storage mechanism 114 for instances of PDU network policies which may be applicable to the related-received PDUs.

In alternative embodiments, PDUs other than the first received PDU or more than one PDU may be processed by the exception processor 112 to determine the policy. This could be accomplished by buffering into a memory device other received PDUs from the related-received PDUs until the PDU to be processed by the exception processor 112 is provided to the exception processor 112.

Related-received PDUs may be asynchronous transfer mode (ATM) cells of a packet or a number of the packets. Alternatively, the related-received PDUs may be PDUs from the stream of incoming PDUs 102 which have identical categorization fields or selection criteria such as: circuit numbers, source or destination addresses, source or destination ports on a communication interface, network protocols, transport protocols, security options, or other contents in any PDU field. The data stream processor 104 preferably includes a receiving unit which receives a stream of PDUs 102 from an ATM communication link. This receiving unit groups together a subset of PDUs from the stream of PDUs 102 as the related-received PDUs based on selection criteria like that described above.

The policy cache exception processor 112 is operatively coupled to a cached instance classifier 108 that caches policy identification information identifying the instance of PDU policy which is to be applied to other PDUs of the related-received PDUs. An instance policy cache 110 also is operatively coupled to the exception processor 112 that caches the instance of PDU policy which is to be applied to other of the related-received PDUs.

One of the advantages of this type of policy caching scheme is that when each PDU is an ATM cell and the related-received PDUs are cells of a particular packet, the policy cache may operate at the cell level only. In other words the exception processor 112 and the cached instance classifier 108 perform operations on a cell by cell basis without reassembling the cells into the particular ATM packet.

Once the instance of PDU policy is determined for the related-received PDUs, the data stream processor 104 applies the instance of PDU policy from the plurality of policies to other PDUs of the related-received PDUs by utilizing the cached policy identification information in the cached instance classifier 108 to retrieve the cached instance of PDU policy from the instance policy cache 110.

In the preferred embodiment, the cached instance classifier 108 includes a content addressable memory (CAM). The data stream processor 104 provides ATM field values (i.e., the user-defined header) from the other of the related-received PDUs to the CAM and receives the policy identification information for the other of the related-received PDUs back from the CAM. A hardware CAM will be used to provide the speed to maintain a full Optical Carrier Level 3 (OC-3) rate or higher communication link in a SONET network. A commercially available CAM such as a AM99C10A-70 48 bit CAM preferably is used. The CAM provides a 48 bit match with an optional read to determine the match position. This feature is used to extend the width of the CAM. Three CAMs (CAM1, CAM2, CAM3) provide a width of 128 bits. The CAM has a minimum write cycle time of 70 nanoseconds (ns).

An example of the data follows. Given the data in Table 1: Match Data, Table 2: CAM data would be generated by the CAM.

TABLE 1

Match Data

| Cam Output | Input Data | | |
|---|---|---|---|
| 0000 | 00 00 00 00 00 01 | 00 00 00 00 01 | 00 00 00 00 01 |
| 0006 | 00 00 00 00 00 01 | 00 00 00 00 01 | 00 00 00 00 0F |
| 0003 | 00 00 00 00 00 01 | 00 00 00 00 0B | 00 00 00 00 0F |
| 0004 | 00 00 00 00 00 01 | 00 00 00 00 02 | 00 00 00 00 03 |
| 0001 | 00 00 00 00 00 0A | 00 00 00 00 01 | 00 00 00 00 0A |
| 0002 | 00 00 00 00 00 0A | 00 00 00 00 01 | 00 00 00 00 0F |
| 0005 | 00 00 00 00 00 06 | 00 00 00 00 01 | 00 00 00 00 0F |

TABLE 2

CAM data

| CAM 1 | | CAM 2 | | CAM 3 | |
|---|---|---|---|---|---|
| addr | data | addr | data | addr | data |
| 0 | 0000 0000 0001 | 0 | 0000 0000 01 00 | 0 | 0000 0000 01 00 |
| 1 | 0000 0000 000A | 1 | 0000 0000 01 01 | 1 | 0000 0000 0A 01 |
| 2 | 0000 0000 0006 | 2 | 0000 0000 0B 00 | 2 | 0000 0000 0F 01 |
| 3 | | 3 | 0000 0000 02 00 | 3 | 0000 0000 0F 02 |
| 4 | | 4 | 0000 0000 01 02 | 4 | 0000 0000 03 03 |
| 5 | | 5 | | 5 | 0000 0000 0F 04 |
| 6 | | 6 | | 6 | 0000 0000 0F 00 |
| 7 | | 7 | | 7 | |
| ... | | ... | | ... | |
| 255 | | 255 | | 255 | |

The CAM would prepend a 4 bytes to the cell. The resulting cell would be 56 bytes long. The HEC byte will be stripped from the incoming cell flow. The 4 byte header will contain the final CAM lookup address.

The CAMs will be maintained by the data stream processor 104. Multiple matches in the CAM will be handled as an error condition that is forwarded to the data stream processor 104 for further processing.

The communication device 100 requires a temporary storage device to hold the cell while the cell is being processed. A single cell deep first-in/first-out (FIFO) buffer preferably is used. The FIFO will hold the cell until a header/trailer is formed. The data will then be (appended/prepended) to the cell flow. After the cell header, the cell will be transferred. In alternative embodiments, the temporary storage may not be needed if the data resides in a trailer. Advantages and disadvantages of both implementations are detailed in Table 3.

TABLE 3

| | Advantages | Disadvantages |
|---|---|---|
| Header | Quicker lookup for hardware | Delay cell to prepend Invalid CRC-10 (possible) |
| Trailer | Valid CRC-10 | Delay to hardware |

CAM1 will contain the virtual path identifier/virtual channel identifier (VPI/VCI) lookup information. The incoming cell will be compared against the CAM data. A match will result in the CAM location being appended to the cell. A miss will result in 0xFF being appended to the cell. The mask bits in CAM1 will be used to shorten the compare length from 48 bits to the 24 VPI/VCI bits. An example of CAM1 is shown in Table 4.

CAM2/CAM3 will contain the IP match data. The matching fields will be the Prototype (8), Source Address (32), and Destination Address (32). A match will result in CAM3's address being appended to the cell. A miss will result in 0xFF being appended. The mask bits in CAM2/3 will not be used. They will be set inactive. The compare field will be the entire 48 bits. An example of CAM2/CAM3 is shown in Table 5.

TABLE 4

VPI/VCI CAM Data

|  | Word 2 | Word 1 | Word 0 |  | Address |
|---|---|---|---|---|---|
| Mask 1 | 0xFFFF | 0x000 | 0x000F |  | Mask |
| CAM 1 | Unused Unused | ATM byte 1 ATM byte 2 | ATM byte 3 ATM byte 4 |  | 0x00 |
|  | ... ... | ... ... | ... ... |  | ... |
|  | ... ... | ... ... | ... ... |  | 0xFE |

TABLE 5

IP CAM Data

|  |  | Word 2 | Word 1 | Word 0 | Address |
|---|---|---|---|---|---|
| CAM 2 | CAM 1 Addr | Proto | SA(31:16) | SA(15:0) | 0x00 |
|  | ... | ... | ... | ... | ... |
|  | ... | ... | ... | ... | 0xFE |
| CAM 3 | CAM2 Addr | 0xFF | DA(31:16) | DA(15:0) | 0x00 |
|  | ... | ... | ... | ... | ... |
|  | ... | ... | ... | ... | 0xFE |

The CAM accesses are aligned on word (32 bit) boundaries with masking. Table 6 shows the address mask.

TABLE 6

| 12 | 11 | 10 | 09 | 08 | 07 | 06 | 05 | 04 | 03 | 02 | 01 | 00 |
|---|---|---|---|---|---|---|---|---|---|---|---|---|
| LO |  | CA |  | CM |  | EC |  | Unused |  |  |  |  |

LO Lockout bit: When set during an access the successive accesses to the specific CAM will be atomic. A read or write this address bit low will free the resource upon completion of the access. It will be necessary to use this feature when updating CAM entries. This will avoid problems with possible invalid compares when constructing an address.
CN CAM Number: CAM2=10, CAM1=01, CAM0=00
CM CAM Com: CAM command mode, an access using this address bit set will cause the word (read/write) to be a CAM command. An access with the address bit cleared will cause the word (read/write) to be CAM data.

The CAM data is written on the lower 2 bytes of the word. The upper two bytes are unused. The interface is a half word or word interface only as shown in Table 7.

TABLE 7

| 31 | 16 | 15 | 00 |
|---|---|---|---|
| Unused |  | CAM Data |  |

The Control register will be used to define the CAM/RAM partition during initialization, enable the match/full flags and mask comparison register. The mask register will also be defined. The CAM's control register should be programmed as follows in Table 8.

TABLE 8

| CAM | 15 RS | 14 | 13 MF | 12 | 11 FF | 10 | 09 IT | 08 | 07 | 06 SEG | 05 | 04 CM | 03 | 02 AI | 01 | 00 XX |
|---|---|---|---|---|---|---|---|---|---|---|---|---|---|---|---|---|
| 2 | 0 | 0 | 0 | 0 | 0 | 0 | 0 | 0 | 1 | 1 | 0 | 1 | 1 | 0 | 0 | 0 |
| 1 | 0 | 0 | 0 | 0 | 0 | 0 | 0 | 0 | 0 | 0 | 0 | 1 | 1 | 0 | 0 | 0 |
| 0 | 0 | 0 | 0 | 0 | 0 | 0 | 0 | 0 | 1 | 0 | 0 | 1 | 1 | 0 | 0 | 0 |

The CAM's mask register 1 should be programmed as follows in Table 9.

TABLE 9

|  | Segment 3 | Segment 2 | Segment 1 | Segment 0 |
|---|---|---|---|---|
| CAM 2 | 0xFC00 | 0x00FF | 0x0000 | 0x0000 |
| CAM 1 | 0x0000 | 0x0000 | 0x0000 | 0x0000 |
| CAM 0 | 0xFC00 | 0x0000 | 0x0000 | 0x0000 |

The CAMs will require a unique sequence of instructions to ensure proper operation. After initializing the CAMs and every CAM update sequence, the Select Persistent Source (SPS) and Select Persistent Destination (SPD) will be set as follows. The SPS register's sss field must be set to 'Memory at Highest-priority Match' or 0x0005. The SPD register's ddd field must be set to 'Comparand Register Masked by MR1' or 0x0140.

CAM entries can be updated using two methods. The first method, hardware lockout, uses HBS(12) equal to a hi (=1). The 'LO', lockout bit, is used to suspend the CAM's compare cycle after finishing the current compare sequence. To start the compare cycle, the last access has HBS(12) set lo (=0).

The second method, validity bit, uses the SPD's vvv field to set the valid bit to false (=0). This disables the compare sequence for this entry. CAM 0's valid bit should be set last.

Examples of this are shown in Tables 10 and 11.

TABLE 10

CAM Reset

| address(15:0) | data(15:0) | r/w | comment |
|---|---|---|---|
| 0×1A00 | 0×0000 | w | CAM2 reset |
| 0×1600 | 0×0000 | w | CAM1 reset |
| 0×1200 | 0×0000 | w | CAM0 reset |

TABLE 11

CAM Update

| address(15:0) | data(15:0) | r/w | comment |
|---|---|---|---|
| 0×1A00 | 0×0804 | w | CAM2 entry |
| 0×1600 | 0×0804 | w | CAM1 entry |
| 0×1200 | 0×0804 | w | CAM0 entry |
| 0×1A00 | 0×0005 | w | CAM2 SPS |
| 0×1600 | 0×0005 | w | CAM1 SPS |
| 0×1200 | 0×0005 | w | CAM0 SPS |
| 0×0A00 | 0×0140 | w | CAM2 SPD |
| 0×0600 | 0×0140 | w | CAM1 SPD |
| 0×0200 | 0×0140 | w | CAM0 SPD |

In an alternative embodiment, the cached instance classifier 108 includes a hash mechanism which performs a hashing function on field values from the other of the related-received PDUs provided by the data stream processor 104. The cached instance classifier 108 uses results of the hashing function to select the policy identification information for the other of the related-received PDUs from a hashing table and subsequently provides the selected policy identification information to the data stream processor 104.

In another alternative embodiment, the cached instance classifier 108 includes a lookup table mechanism. The data stream processor 104 uses field values from the other of the related-received PDUs as an index to the lookup table mechanism and retrieves the policy identification information for the other of the related-received PDUs in the lookup table mechanism pointed to by the index.

In operation, the data stream processor 104 utilizes field values from each PDU to check the policy cache for a cached instance of PDU policy from the instance policy cache 110 for each PDU. The cached instance of PDU policy is retrieved when the field values correspond to cached policy identification information. As a result, the data stream processor 104 checks for a cached instance of PDU policy for each PDU and obtains an instance of PDU policy from the exception processor 112 when a cached instance of PDU policy is not found in the instance policy cache 110.

The data stream processor 104 also preferably includes enforcement mechanism that performs the instance of network policy by filtering or auditing the stream of PDUs into a policy-enforced stream of PDUs. A sending unit is operatively coupled to the enforcement mechanism to sends the policy-enforced stream of PDUs out of the communication device 100 as the output data stream of PDUs 106.

As previously noted, the communication device 100 may be part of a more complicated device which operates on a data stream headed upstream and another data stream headed downstream. In such cases, the data stream processor preferably includes a first receiving unit which receives a first stream of PDUs from an upstream communication link and a second receiving unit which receives a second stream of PDUs from a downstream communication link. Only one of the first and the second streams of PDUs includes the related-received PDUs upon which operations are performed; however other components in the communication device 100 may perform similar policy operations on another set of related-received PDUs. The data stream processor 104 also preferably includes an enforcement mechanism that performs the instance of network policy by filtering or auditing one of the first and the second stream of PDUs into a policy-enforced stream of PDUs such that instances of network policy are enforced in the upstream and downstream communication links.

Figure 2:
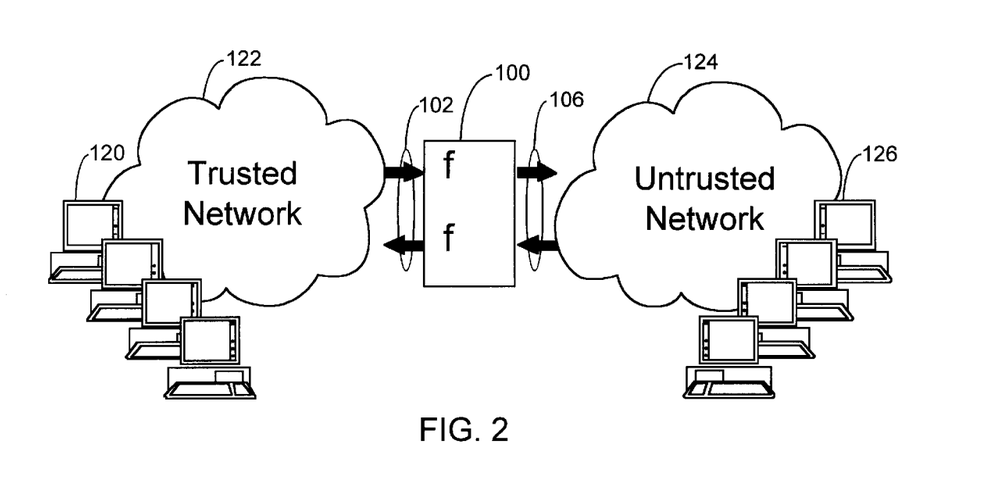
FIGS. 2 and 3 are block diagram showing the preferred embodiment communication device of FIG. 1 within various communication network topologies in accordance with the present invention.

Referring now to FIG. 2, the communication device 100 has the advantage of enabling isolation of physical media management functions (e.g., a synchronous optical network (SONET) as used in ATM communications). It also allows the assertion of policy (e.g., filtering) and/or auditing of ATM signaling as well as Internet Protocol (IP), Transmission Control Protocol (TCP), and User Datagram Protocol (UDP) communication on virtual circuit payloads without reassembling the PDUs from the individual cells. A discussion of how this device may be operated in a data network follows.

If this communication device 100 is present at both ends of a communication link (e.g., a virtual circuit (VC)), then this device 100 is capable of providing additional capabilities. For example, site authentication during ATM signaling and a limited form of privacy for data as it passes through an untrusted network may be provided. An untrusted network is a public or private network which is not within a sphere of influence of network policies being enforced by the communication device 100.

In a first configuration, shown in FIG. 2, the communication device 100 can be used as a single ended filter device without knowledge of other security devices. This communication device 100 would be able to provide a "first line" of defense for local hosts 120 on a trusted network 122 to control and audit non-authenticated traffic on an outgoing data stream 106 headed upstream to and an incoming data stream 102 headed downstream from the untrusted network 124 including hosts 126. The communication device 100 would filter and/or audit the data communication traffic based on the ATM, IP, other protocol, or security level within the PDU.

Figure 3:
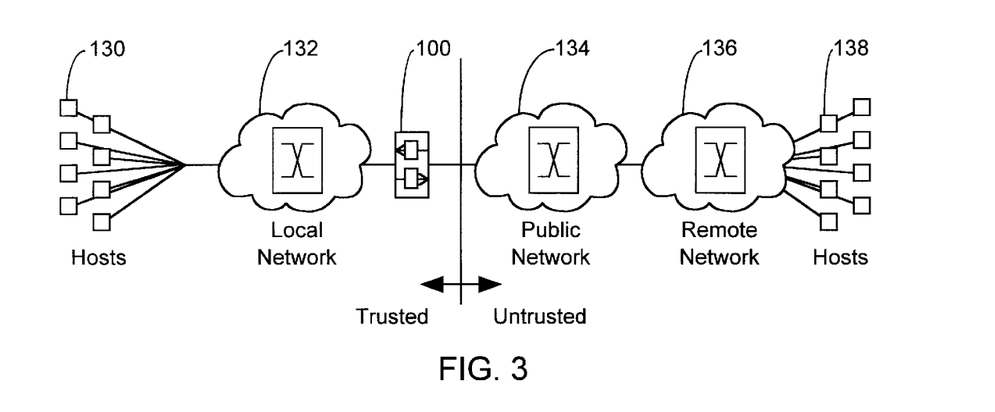

In a second configuration, shown in FIG. 3, the communication device 100 can provide some limited authentication and filtering based on source or destination addresses between hosts 130 within the local network 132 and hosts 138 within a remote network 136. In this configuration the authentication and filtering for network policy is limited, because the data traffic passes through an untrusted network (e.g., public network 134) which may compromise network policies being enforced by communication device 100. This configuration could not protect the data which flows over the public network 134 or authenticate that this data was not inserted within the public network 134 in an ATM VC operating between local network 132 and remote network 136.

If a second communication device were added between the public network 134 and the remote network 136 which enforced some of the same network policies as communication device 100, then even stronger network policy could be enforced. In this case, privacy and authentication of the ATM signaling as well as an ATM VC of data traffic between local network 132 and remote network 136 could be provided. This configuration could protect the data which flows over the public network 134 and authenticate that this data was not inserted in the VC within the public network 134 when ATM cell stream level encryption is used.

Alternatively, cell stream encryption can be accomplished in management processors that run the ATM Signaling code. When traffic flows between the two private networks 132 and 136, it can be authenticated as originating and kept private. This means that in a mixed network such as local network 132, where some traffic is from an authenticated private network 136 and some is from a non-authenticated network 134, the communication device 100 would be able to filter both data traffic types being communicated over the same physical media.

In some network configurations, the communication device 100 may be used in positions other than boundaries or borders between trusted and untrusted networks for monitoring data traffic within a network. A group of communication devices 100 could work in conjunction with one another to enforce a network wide policy (e.g., monitor a cell stream for particular contents or prevent access to certain destination ports or addresses).

Figure 4:
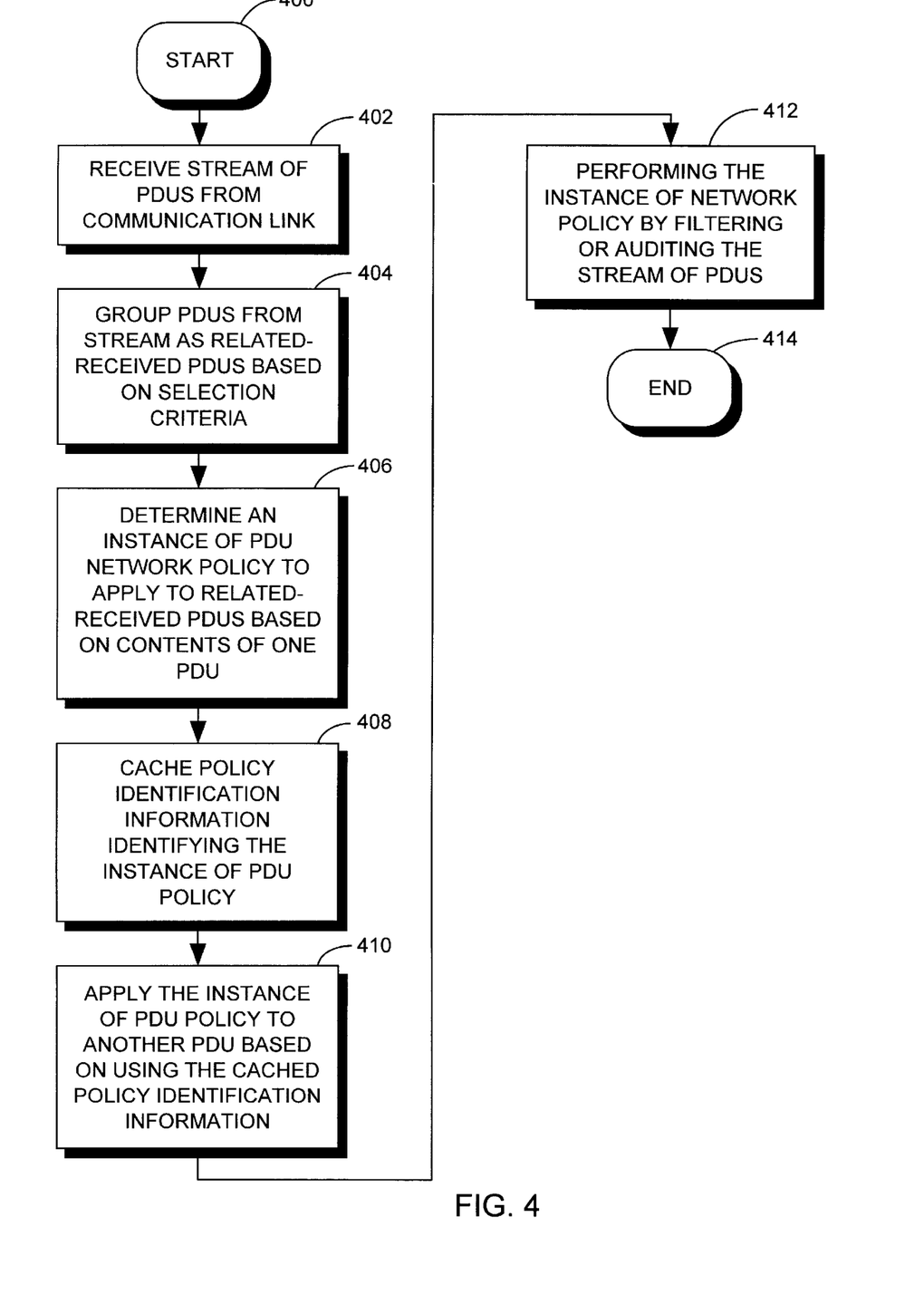
FIG. 4 is a flowchart detailing preferred embodiment steps of policy caching in accordance with the present invention.

The present invention can be summarized in reference to FIG. 4 which is a flowchart of the preferred embodiment network policy caching method for use in a communication device connected to a communication link (e.g., a data network or bus). This method is performed by device-implemented steps in a series of distinct processing steps 400–414 that can be implemented in one or more processors.

A stream of PDUs is received 402 from a communication link. A subset of PDUs from the stream of PDUs are grouped together 404 as related-received PDUs based on selection criteria. This selection criteria may take many forms. For example, the related-received PDUs may be asynchronous transfer mode (ATM) cells of a packet or a number of the packets. Alternatively, the related-received PDUs may be PDUs from the stream of PDUs which have identical categorization fields such as: circuit numbers, source or destination addresses, source or destination ports on a communication interface, network protocols, transport protocols, security options, or other contents in any PDU field.

An instance of protocol data unit (PDU) network policy is determined 406 from several policies which may be applied to the related-received PDUs based on contents of one of the related-received PDUs (e.g., a first PDU of the related-received PDUs). Subsequently, policy identification information identifying the instance of PDU policy which is to be applied to other PDUs of the related-received PDUs is cached 408. The instance of PDU policy from the several policies is applied 410 to another PDU of the related-received PDUs based on using the cached policy identification information. Subsequently, the instance of network policy can be performed 412 by filtering or auditing the stream of PDUs.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, the communication device can be separate from or integrated with a device that performs other data communication related activities such as a data network device, a computer, a monitoring device, a switch, a router, a bridge, and/or a firewall without departing from the spirit and scope of the invention as claimed.

It will be appreciated by those skilled in the art, that although the present invention was described in reference to the communication link being part of an asynchronous transfer mode (ATM) network, it is not limited to this type of communication link. For example, a synchronous optical network (SONET), fiber distributed data interchange (FDDI) network, a frame relay network, Ethernet, 100-Mbps Ethernet, gigabit Ethernet, high performance parallel interface (HIPPI), Fibre Channel, switched multimegabit data Service (SMDSO, X.25 network, integrated services digital network (ISDN), token ring, public switched telephone network (PSTN), a cable modem network, a serial interface, a parallel interface, a computer bus, or the like are all types of communication links which can practice the present invention without departing from the scope and spirit of the present invention.

Similarly, the communication link can be utilized in conjunction with a multitude of different network signaling protocols without departing from the scope and spirit of the present invention. For example, transmission control protocol/internet protocol (TCP/IP), AppleTalk, DECNet, system network architecture (SNA), private network node interface (PNNI), user-network interface (UNI), simple protocol for asynchronous transfer mode network signaling (SPANS), interim local management interface (ILMI), operations administration and maintenance (OAM) interface, and the like are all network signaling protocols in which the communication link may be utilized.

What is claimed is:

1. A policy caching method for use in a communication device, comprising the steps of:

determining an instance of protocol data unit (PDU) network policy from a plurality of policies to be applied to related-received PDUs based on contents of one of the related-received PDUs, wherein the related-received PDUs are a subset of a stream of PDUs and may be distributed throughout said stream of PDUs; and caching policy identification information identifying the instance of PDU policy which is to be applied to other PDUs of the related-received PDUs.

2. The policy caching method of claim 1 further comprising a step of applying the instance of PDU policy from the plurality of policies to another PDU of the related-received PDUs based on using the cached policy identification information.

3. The policy caching method of claim 1 wherein the determining step comprises determining the instance of PDU policy based on contents of a first PDU of the related-received PDUs received by the communication device.

4. The policy caching method of claim 1, further comprising a step of receiving the stream of PDUs from a communication link including related-received PDUs.

5. The policy caching method of claim 4 wherein the communication link is selected from a group consisting of: an asynchronous transfer mode (ATM) network, a synchronous optical network (SONET), fiber distributed data interchange (FDDI) network, a frame relay network, Ethernet, 100-Mbps Ethernet, gigabit Ethernet, high performance parallel interface (HIPPI), Fibre Channel, switched multimegabit data Service (SMDS), X.25 network, integrated services digital network (ISDN), token ring, public switched telephone network (PSTN), a cable modem network, a serial interface, a parallel interface, and a computer bus.

6. The policy caching method of claim 4 wherein the communication link utilizes a network signaling protocol selected from a group consisting of: transmission control protocol/internet protocol (TCP/IP), AppleTalk, DECNet, system network architecture (SNA), private network node interface (PNNI), user-network interface (UNI), simple protocol for asynchronous transfer mode network signaling (SPANS), interim local management interface (ILMI), and operations administration and maintenance (OAM) interface.

7. The policy caching method of claim 4, further comprising a step of grouping together the subset of PDUs from the stream of PDUs as the related-received PDUs based on selection criteria selected from a group consisting of:
   a) the stream of PDUs comprising a stream of cells and the related-received PDUs comprising cells of a particular packet;
   b) the stream of PDUs comprising PDUs from the stream of PDUs having identical circuit numbers;
   c) the stream of PDUs comprising packets in a series of frames and the related-received PDUs comprising a number of the packets;
   d) the related-received PDUs comprising PDUs from the stream of PDUs having identical source addresses;
   e) the related-received PDUs comprising PDUs from the stream of PDUs having identical destination addresses;
   f) the related-received PDUs comprising PDUs from the stream of PDUs having identical source ports on a communication interface;
   g) the related-received PDUs comprising PDUs from the stream of PDUs having destination source ports on a communication interface;
   h) the related-received PDUs comprising PDUs from the stream of PDUs having identical network protocols;
   i) the related-received PDUs comprising PDUs from the stream of PDUs having identical transport protocols;
   j) the related-received PDUs comprising PDUs from the stream of PDUs having identical security options; and
   k) the related-received PDUs comprising PDUs from the stream of PDUs having identical contents in any PDU field.

8. The policy caching method of claim 4 further comprising a step of performing the instance of network policy by filtering or auditing the stream of PDUs.

9. The policy caching method of claim 1 wherein the communication device is selected from a group consisting of: a data network device, a computer, a monitoring device, a switch, a router, a bridge, and.

10. The policy caching method of claim 1 wherein each PDU comprises a cell and the related-received PDUs comprise cells of a particular packet such that the policy caching method is performed by the communication device on a cell by cell basis without reassembling the cells into the particular packet.

11. A policy caching method for use in a communication device, comprising steps of:
   (a) receiving a stream of PDUs from a communication link;
   (b) grouping together a subset of PDUs from the stream of PDUs as related-received PDUs based on selection criteria;
   (c) determining an instance of protocol data unit (PDU) network policy from a plurality of policies to be applied to the related-received PDUs based on contents of one of the related-received PDUs;
   (d) caching policy identification information identifying the instance of PDU policy which is to be applied to other PDUs of the related-received PDUs;
   (e) applying the instance of PDU policy from the plurality of policies to another PDU of the related-received PDUs based on using the cached policy identification information; and
   (f) performing the instance of network policy by filtering or auditing the stream of PDUs.

12. The policy caching method of claim 11 wherein the determining step comprises determining the instance of PDU policy based on contents of a first PDU of the related-received PDUs received by the communication device.

13. The policy caching method of claim 11 wherein the communication link is selected from a group consisting of: an asynchronous transfer mode (ATM) network, a synchronous optical network (SONET), fiber distributed data interchange (FDDI) network, a frame relay network, Ethernet, 100-Mbps Ethernet, gigabit Ethernet, high performance parallel interface (HIPPI), Fibre Channel, switched multimegabit data Service (SMDS0, X.25 network, integrated services digital network (ISDN), token ring, public switched telephone network (PSTN), a cable modem network, a serial interface, a parallel interface, and a computer bus.

14. The policy caching method of claim 11 wherein the communication link utilizes a network signaling protocol selected from a group consisting of: transmission control protocol/internet protocol (TCP/IP), AppleTalk, DECNet, system network architecture (SNA), private network node interface (PNNI), user-network interface (UNI), simple protocol for asynchronous transfer mode network signaling (SPANS), interim local management interface (ILMI), and operations administration and maintenance (OAM) interface.

15. The policy caching method of claim 11 wherein the selection criteria for the grouping step is selected from a group consisting of:
   (a) the stream of PDUs comprising a stream of cells and the related-received PDUs comprising cells of a particular packet;
   (b) the stream of PDUs comprising PDUs from the stream of PDUs having identical circuit numbers;
   (c) the stream of PDUs comprising packets in a series of frames and the related-received PDUs comprising a number of the packets;
   (d) the related-received PDUs comprising PDUs from the stream of PDUs having identical source addresses;
   (e) the related-received PDUs comprising PDUs from the stream of PDUs having identical destination addresses;
   (f) the related-received PDUs comprising PDUs from the stream of PDUs having identical source ports on a communication interface;
   (g) the related-received PDUs comprising PDUs from the stream of PDUs having identical destination ports on a communication interface;
   (h) the related-received PDUs comprising PDUs from the stream of PDUs having identical network protocols;
   (i) the related-received PDUs comprising PDUs from the stream of PDUs having identical transport protocols;
   (j) the related-received PDUs comprising PDUs from the stream of PDUs having identical security options; and
   (k) the related-received PDUs comprising PDUs from the stream of PDUs having identical contents in any PDU field.

16. The policy caching method of claim 11 wherein the communication device is selected from a group consisting of a data network device, a computer, a monitoring device, a switch, a router, a bridge, and a firewall.

17. The policy caching method of claim 11 wherein each PDU comprises a cell and the related-received PDUs comprise cells of a particular packet such that the policy caching method is performed by the communication device on a cell by cell basis without reassembling the cells into the particular packet.

18. A policy cache for use in a communication device, comprising:
   a) exception processing means for determining an instance of protocol data unit (PDU) network policy from a plurality of policies to be applied to related-received PDUs based on contents of one of the related-received PDUs, wherein the related-received PDUs are a subset of a stream of PDUs and may be distributed throughout said stream of PDUs; and
   b) cached instance classification means, operatively coupled to the exception processing means, for caching policy identification information identifying the instance of PDU policy which is to be applied to other PDUs of the related-received PDUs.

19. The policy cache of claim 18 further comprising instance policy cache means, operatively coupled to the exception processing means, for caching the instance of PDU policy which is to be applied to other of the related-received PDUs.

20. The policy cache of claim 18 wherein the exception processing means comprises means for determining the instance of PDU policy based on contents of a first PDU of the related-received PDUs received by the exception processing means.

21. The policy cache of claim 18 wherein each PDU comprises a cell and the related-received PDUs comprise cells of a particular packet such that the exception processing means and the cached instance classification means are performed operations on a cell by cell basis without reassembling the cells into the particular packet.

22. A communication device comprising the policy cache of claim 19 and further comprising a data stream processing means, operatively coupled to the policy cache, for applying the instance of PDU policy from the plurality of policies to another PDU of the related-received PDUs by utilizing the cached policy identification information to retrieve the cached instance of PDU policy from the instance policy cache means.

23. The communication device of claim 22 wherein the cached instance classification means comprises a content addressable memory (CAM) such that the data stream processing means provides field values from the other of the related-received PDUs to the CAM and receives the policy identification information for the other of the related-received PDUs back from the CAM.

24. The communication device of claim 22 wherein the cached instance classification means comprises a hash mechanism which performs a hashing function on field values from the other of the related-received PDUs provided by the data stream processing means, uses results of the hashing function to select the policy identification information for the other of the related-received PDUs from a hashing table, and provides the selected policy identification information to the data stream processing means.

25. The communication device of claim 22 wherein the cached instance classification means comprises a lookup table mechanism such that the data stream processing means uses field values from the other of the related-received PDUs as an index to the lookup table mechanism and retrieves the policy identification information for the other of the related-received PDUs in the lookup table mechanism pointed to by the index.

26. The communication device of claim 22 wherein the data stream processing means comprises means for utilizing field values from each PDU to check the policy cache for a cached instance of PDU policy from the instance policy cache means for each PDU and means for retrieving the cached instance of PDU policy when the field values correspond to cached policy identification information such that the data stream processing means checks for a cached instance of PDU policy for each PDU and obtains an instance of PDU policy from the exception processing means when a cached instance of PDU policy is not found in the instance policy cache means.

27. The communication device of claim 22, wherein the data stream processing means comprises a receiving unit which receives the stream of PDUs from a communication link, the stream of PDUs including the related-received PDUs.

28. The communication device of claim 27 wherein the data stream processing means further comprises enforcement means for performing the instance of network policy by filtering or auditing the stream of PDUs into a policy-enforced stream of PDUs.

29. The communication device of claim 28 wherein the data stream processing means further comprises sending means, operatively coupled to the enforcement means, for sending the policy-enforced stream of PDUs out of the communication device as the output data stream of PDUs.

30. The communication device of claim 27 wherein the data stream processing means comprises a first receiving unit which receives a first stream of PDUs from an upstream communication link and a second receiving unit which receives a second stream of PDUs from a downstream communication link, only one of the first and the second streams of PDUs includes the related-received PDUs upon which network policy is to be determined, the data stream processing means further comprises enforcement means for performing the instance of network policy by filtering or auditing one of the first and the second stream of PDUs into a policy-enforced stream of PDUs such that instances of network policy are enforced in the upstream and downstream communication links.

31. The communication device of claim 27 wherein the communication link is selected from a group consisting of: an asynchronous transfer mode (ATM) network, a synchronous optical network (SONET), fiber distributed data interchange (FDDI) network, a frame relay network, Ethernet, 100-Mbps Ethernet, gigabit Ethernet, high performance parallel interface (HIPPI), Fibre Channel, switched multimegabit data Service (SMDS), X.25 network, integrated services digital network (ISDN), token ring, public switched telephone network (PSTN), a cable modem network, a serial interface, a parallel interface, and a computer bus.

32. The communication device of claim 27 wherein the communication link utilizes a network signaling protocol selected from a group consisting of: transmission control protocol/internet protocol (TCP/IP), AppleTalk, DECNet, system network architecture (SNA), private network node interface (PNNI), user-network interface (UNI), simple protocol for asynchronous transfer mode network signaling (SPANS), interim local management interface (ILMI), and operations administration and maintenance (OAM) interface.

33. The communication device of claim 27, wherein the data stream processing means receiving unit comprises means for grouping together the subset of PDUs from the stream of PDUs as the related-received PDUs based on selection criteria selected from a group consisting of:
   a) the stream of PDUs comprising a stream of cells and the related-received PDUs comprising cells of a particular packet;

b) the stream of PDUs comprising PDUs from the stream of PDUs having identical circuit numbers;

c) the stream of PDUs comprising packets in a series of frames and the related-received PDUs comprising a number of the packets;

d) the related-received PDUs comprising PDUs from the stream of PDUs having identical source addresses;

e) the related-received PDUs comprising PDUs from the stream of PDUs having identical destination addresses;

f) the related-received PDUs comprising PDUs from the stream of PDUs having identical source ports on a communication interface;

g) the related-received PDUs comprising PDUs from the stream of PDUs having destination source ports on a communication interface;

h) the related-received PDUs comprising PDUs from the stream of PDUs having identical network protocols;

i) the related-received PDUs comprising PDUs from the stream of PDUs having identical transport protocols;

j) the related-received PDUs comprising PDUs from the stream of PDUs having identical security options; and k) the related-received PDUs comprising PDUs from the stream of PDUs having identical contents in any PDU field.

34. The communication device of claim 22 further comprising a general policy storage mechanism, operatively coupled to the exception processing means, which stores the plurality of network policies such that the exception processing means can query the general policy storage mechanism for instances of PDU network policies which may be applicable to the related-received PDUs.

35. The communication device of claim 22 wherein the communication device is selected from a group consisting of: a data network device, a computer, a monitoring device, a switch, a router, a bridge, and a firewall.

* * * * *